(12) United States Patent
Houshito et al.

(10) Patent No.: US 9,308,516 B2
(45) Date of Patent: Apr. 12, 2016

(54) CATALYST CARRIER FOR EXHAUST GAS AND EXHAUST GAS-CLEANING CATALYST

(71) Applicant: Mitsui Mining & Smelting Co., Ltd., Tokyo (JP)

(72) Inventors: Ohki Houshito, Tokyo (JP); Yunosuke Nakahara, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/427,802

(22) PCT Filed: Jul. 12, 2013

(86) PCT No.: PCT/JP2013/069136
§ 371 (c)(1),
(2) Date: Mar. 12, 2015

(87) PCT Pub. No.: WO2014/076999
PCT Pub. Date: May 22, 2014

(65) Prior Publication Data
US 2015/0224471 A1  Aug. 13, 2015

(30) Foreign Application Priority Data
Nov. 16, 2012  (JP) ................. 2012-252039

(51) Int. Cl.
| | |
|---|---|
| B01J 23/00 | (2006.01) |
| B01J 23/10 | (2006.01) |
| B01J 23/42 | (2006.01) |
| B01J 23/44 | (2006.01) |
| B01J 20/06 | (2006.01) |
| B01J 23/63 | (2006.01) |
| B01D 53/94 | (2006.01) |
| B01J 37/02 | (2006.01) |
| B01J 21/06 | (2006.01) |
| B01J 35/04 | (2006.01) |

(52) U.S. Cl.
CPC .............. *B01J 20/06* (2013.01); *B01D 53/945* (2013.01); *B01J 21/066* (2013.01); *B01J 23/002* (2013.01); *B01J 23/63* (2013.01); *B01J 35/04* (2013.01); *B01J 37/0244* (2013.01); *B01J 37/0248* (2013.01); *B01D 2255/1021* (2013.01); *B01D 2255/1023* (2013.01); *B01D 2255/1025* (2013.01); *B01D 2255/2092* (2013.01); *B01D 2255/407* (2013.01); *B01D 2255/908* (2013.01); *B01D 2255/9022* (2013.01); *B01J 2523/00* (2013.01); *Y02T 10/22* (2013.01)

(58) Field of Classification Search
CPC .......... B01J 21/066; B01J 23/10; B01J 23/44; B01J 23/63
USPC ......................................... 502/304, 339, 349
See application file for complete search history.

(56) References Cited

U.S. PATENT DOCUMENTS

| | | | | |
|---|---|---|---|---|
| 4,927,799 A * | 5/1990 | Matsumoto | .......... | B01D 53/945 423/213.5 |
| 5,075,276 A * | 12/1991 | Ozawa | ................. | B01D 53/945 423/213.5 |
| 6,576,207 B1 | 6/2003 | Mussmann et al. | | |
| 7,205,257 B2 * | 4/2007 | Tanaka | ................. | B01D 53/945 502/302 |
| 7,622,418 B2 * | 11/2009 | Tanaka | ................. | B01D 53/945 502/325 |
| 7,871,956 B2 * | 1/2011 | Wakita | ................. | B01D 53/945 423/593.1 |
| 8,187,995 B2 * | 5/2012 | Wakita | ................. | B01D 53/945 423/593.1 |
| 8,202,819 B2 * | 6/2012 | Kohara | .............. | B01D 53/9468 422/169 |
| 8,697,600 B2 * | 4/2014 | Nobukawa | ........... | B01D 53/945 502/302 |
| 2011/0113754 A1 | 5/2011 | Kohara et al. | | |
| 2013/0029840 A1 | 1/2013 | Morikawa et al. | | |

FOREIGN PATENT DOCUMENTS

| | | |
|---|---|---|
| JP | 11-021171 | 1/1999 |
| JP | 2004-160433 | 6/2004 |
| JP | 2005-296735 | 10/2005 |
| JP | 2008-18322 | 1/2008 |
| JP | 2009-84061 | 4/2009 |
| JP | 2011-219329 | 11/2011 |
| JP | 2012-187457 | 10/2012 |
| WO | 2010/064497 | 6/2010 |

OTHER PUBLICATIONS

International Search Report dated Sep. 10, 2013 filed in PCT/JP2013/069136.

* cited by examiner

*Primary Examiner* — Cam N. Nguyen
(74) *Attorney, Agent, or Firm* — Rankin, Hill & Clark LLP

(57) ABSTRACT

Provided is a novel catalyst carrier for exhaust gas which relates to an OSC material containing a ceria-zirconia composite oxide and is able to enhance the low temperature properties and to exert excellent OSC even at the time of engine start and excellent exhaust gas purification performance. A catalyst carrier for exhaust gas containing a fluorite type ceria-zirconia composite oxide and ceria formed from the fluorite type ceria-zirconia composite oxide by phase separation proposed.

6 Claims, No Drawings

CATALYST CARRIER FOR EXHAUST GAS AND EXHAUST GAS-CLEANING CATALYST

TECHNICAL FIELD

The present invention relates to an exhaust gas purifying catalyst usable to purify exhaust gas discharged from an internal combustion engine and a catalyst carrier for exhaust gas (also referred to as the "OSC material" in the invention) having oxygen storage capacity (OSC).

BACKGROUND ART

The exhaust gas of vehicles using gasoline as fuel contains harmful components such as hydrocarbons (HC), carbon monoxide (CO), nitrogen oxides (NOx) and the like. Each of the harmful components is desired to be purified by a catalyst such that the hydrocarbons (HC) are converted into water and carbon dioxide by oxidation, the carbon monoxide (CO) is converted into carbon dioxide by oxidation, and the nitrogen oxides (NOx) are converted into nitrogen by reduction.

Three way catalysts (TWC) which can oxidize and reduce CO, HC and NOx are used as such a catalyst to treat the exhaust gas (hereinafter, referred to as the "exhaust gas purifying catalyst").

As such three way catalysts, those obtained by supporting a refractory oxide porous material having a great specific surface area, for example, an alumina porous material having a great specific surface area with a precious metal such as platinum (Pt), palladium (Pd) and rhodium (Rh) and then supporting a substrate, for example, a monolithic substrate composed of a refractory ceramic or a metal honeycomb structure with this or supporting refractory particles with this are known.

In the three way catalysts, the precious metal has a function to convert the hydrocarbons in the exhaust gas into carbon dioxide and water by oxidization and to convert the carbon monoxide into carbon dioxide by oxidization but to reduce the nitrogen oxides to nitrogen. It is preferable to preserve a ratio of air to fuel (air fuel ratio) at a constant value (at the theoretical air fuel ratio) in order to effectively cause the catalytic action for both of these reactions at the same time.

The air fuel ratio of the internal combustion engine of vehicles and the like greatly changes depending on the driving conditions such as acceleration, deceleration, low speed driving, and high speed driving, and thus the air fuel ratio (A/F) which fluctuates depending on the operating conditions of the engine is constantly controlled by using the oxygen sensor. However, it is impossible for the catalyst to sufficiently exert a performance as a purifying catalyst only by controlling the air fuel ratio (A/F) as described above, and thus the catalyst itself is also required to have an action of controlling the air fuel ratio (A/F). Hence, a catalyst obtained by adding a promoter to a precious metal which is a catalytically active component is used for a purpose to prevent a decrease in the purification performance of the catalyst caused by the change in the air fuel ratio by the chemical action of the catalyst itself.

As such a promoter, a promoter (OSC material) is known which exhibits the oxygen storage capacity (OSC) to release oxygen in a reducing atmosphere and to absorb oxygen in an oxidizing atmosphere. For example, ceria (cerium oxide, $CeO_2$) and a ceria-zirconia composite oxide are known as the OSC material exhibiting the oxygen storage capacity.

Ceria exerts the oxygen releasing and absorbing property in association with a change in valence (trivalent ⇔ tetravalent), and a change in valence of ceria is further promoted by using zirconia in the form of a solid solution, and thus the technology using a ceria-zirconia composite oxide is adopted as the mainstream technology of the recent exhaust gas purifying catalysts.

With regard to the ceria-zirconia composite oxide, for example, a catalyst is disclosed in Patent Document 1 (JP 2005-296735 A) which is obtained by supporting iron oxide on a carrier containing a ceria-zirconia composite oxide.

In addition, a catalyst is disclosed in Patent Document 2 (JP 2004-160433 A) which is composed of a composite oxide of at least one kind of metal selected from the group consisting of ceria, zirconia, aluminum, titanium, and manganese, and iron.

A catalyst is disclosed in Patent Document 3 (JP 2008-18322 A) which has a configuration in which iron oxide is dispersed in a ceria-zirconia composite oxide so as to at least partially form a solid solution.

A ceria-zirconia composite oxide is disclosed in Patent Document 4 (JP 2009-84061 A) in which the regularly arranged phase of the pyrochlore phase type is still present at 50% or more after heating for 5 hours at a temperature condition of 1000° C. in the air.

Moreover, an OSC material is disclosed in Patent Document 5 (JP 2011-219329 A) which is a ceria-zirconia-based composite oxide containing a composite oxide of ceria and zirconia in which the content ratio of cerium to zirconium in the composite oxide is in the range of 43:57 to 48:52 by molar ratio ([cerium]:[Zirconium]) and the phase separation of ceria is suppressed, that is, which contains a fluorite type ceria-zirconia composite oxide and a pyrochlore type ceria-zirconia composite oxide.

PRIOR ART DOCUMENTS

Patent Documents

Patent Document 1: JP 2005-296735 A
Patent Document 2: JP 2004-160433 A
Patent Document 3: JP 2008-18322 A
Patent Document 4: JP 2009-84061 A
Patent Document 5: JP 2011-219329 A

SUMMARY OF THE INVENTION

Problem to be Solved by the Invention

With regard to vehicles, the temperature of the catalyst is maintained at about from 500 to 600° C. at the time of steady driving, and thus the oxygen releasing absorbing capacity of the ceria-zirconia composite oxide is also easily exerted. However, the ceria-zirconia composite oxide is not easily activated (oxygen releasing absorbing property is low) since the temperature of the catalyst is low immediately after the engine is started, and thus it is considered to be difficult for the ceria-zirconia composite oxide to effectively exert the exhaust gas purification performance.

However, it is required to further enhance the low temperature properties, that is, the OSC and the exhaust gas purification performance at the time of engine start even in view of the time background that an engine stop system (idling stop system) at the time of stopping the vehicle to stop the engine during parking and stopping the vehicle, waiting for a signal and the like has been adopted in recent years in order to save fuel and cut down the exhaust gas.

An object of the invention is to provide a novel catalyst carrier for exhaust gas which relates to an OSC material containing a ceria-zirconia composite oxide and is able to enhance the low temperature properties and to exert excellent OSC even at the time of engine start and excellent exhaust gas purification performance, and a catalyst for exhaust gas.

Means for Solving Problem

The invention proposes a catalyst carrier for exhaust gas containing a fluorite type ceria-zirconia composite oxide and ceria formed from the fluorite type ceria-zirconia composite oxide by phase separation.

Effect of the Invention

The catalyst carrier for exhaust gas proposed by the invention can enhance the low temperature properties as an OSC material and exert excellent OSC at the time of engine start and excellent exhaust gas purification performance.

MODE(S) FOR CARRYING OUT THE INVENTION

Next, exemplary embodiments for carrying out the invention will be described. However, the invention is not limited to the embodiments described below.

<The Present Catalyst Carrier>

The catalyst carrier according to an example of the present embodiment (referred to as the "present catalyst carrier") is a catalyst carrier containing an OSC material (referred to as the "present OSC material") which contains a fluorite type ceria-zirconia composite oxide and ceria formed from the fluorite type ceria-zirconia composite oxide by phase separation.

Meanwhile, the "fluorite type ceria-zirconia composite oxide" means a fluorite type ceria-zirconia composite oxide ($Ce_xZr_{1-x}O_2$ (in the formula: $0<X<1$)) as a solid solution phase in which ceria is not phase separated.

In addition, the phrase "ceria is phase separated" means a state in which both the diffraction peak attributing to $2\theta=28.5°$ and the diffraction peak attributing to $2\theta=29.0$ to $30.0°$ are present in the X-ray diffraction measurement.

In the present OSC material, with regard to the content proportion of ceria formed by phase separation to the fluorite type ceria-zirconia composite oxide, the peak area ratio (hereinafter, referred to as the "peak area ratio A") of the diffraction peak at $2\theta=28.5°$ to the diffraction peak between $2\theta=29.0$ to $30.0°$ (that is, a diffraction peak having the peak top between $2\theta=29.0$ to) $30.0°$ determined from the X-ray diffraction pattern using a CuKα ray obtained by the X-ray diffraction measurement can be represented as an index.

In other words, the diffraction peak of $2\theta=28.5°$ attributes to the (111) plane of ceria ($CeO_2$) formed by phase separation and the diffraction peak between $2\theta=29.0$ to $30.0°$ attributes to the (111) plane of the fluorite type ceria-zirconia composite oxide ($Ce_xZr_{1-x}O_2$ (in the formula: $0<X<1$)) as a solid solution phase, and thus it is possible to represent the peak area ratio A as an index of the content proportion of ceria formed by phase separation to the fluorite type ceria-zirconia composite oxide. Consequently, the peak area ratio A is also referred to as the "phase separation rate" in the invention.

Moreover, it is possible to exert excellent OSC in a low temperature region and excellent exhaust gas purification performance when the peak area ratio A in the present OSC material is in a range of from 0.05 to 1.00.

Consequently, the peak area ratio A in the present OSC material is still more preferably from 0.05 to 0.50 and even more preferably 0.30 or less among them, particularly 0.10 or more or 0.25 or less among them, and 0.15 or more or 0.25 or less among them from this point of view.

In the present OSC material, the content ratio of cerium to zirconium is not particularly limited as long as it is in the range in which a fluorite type ceria-zirconia composite oxide can be formed. As a guideline, it is possible to mention from 10:90 to 70:30 as the content ratio (molar ratio) of cerium to zirconium, and it is preferably from 10:90 to 50:50. It is preferable that the content ratio of cerium to zirconium be in the range of from 10:90 to 50:50 (13.4:86.6 to 58.3:41.7 in terms of mass ratio of the oxide) since it is possible to suppress the aggregation of the catalytically active component, particularly palladium (Pd) while maintaining heat resistance.

The present OSC material may have a particulate shape or another shape.

(Production Method of the Present OSC Material)

It is important for the present OSC material to contain ceria formed from a fluorite type ceria-zirconia composite oxide by phase separation in the process of producing the fluorite type ceria-zirconia composite oxide. As an image, the present OSC material is in a state in which ceria formed by phase separation is present on the surface of a particle which is a solid solution body of the fluorite type ceria-zirconia composite oxide. Consequently, the present OSC material is different from a mixture of a fluorite type ceria-zirconia composite oxide and ceria particles.

The production method of the present OSC material is not particularly limited. For example, aqueous ammonia or an aqueous solution of Na hydroxide is added dropwise to a solution prepared by mixing a solution (referred to as the "solution 1") obtained by dissolving Zr oxynitrate dihydrate or Zr oxychloride octahydrate in deionized water with a solution (referred to as the "solution 2") obtained by dissolving Ce nitrate hexahydrate or Ce chloride heptahydrate in deionized water at a rate of from 10 to 110 mL/min until the pH becomes 8 or more so as to obtain a hydroxide (precursor 1: the portion to be the CZ core).

A solution (referred to as the "solution 3": ceria phase separated portion (a part thereof reacts with the previous CZ core to be a solid solution)) obtained by dissolving Ce nitrate hexahydrate or Ce chloride heptahydrate in deionized water is added to an aqueous solution which is prepared by dispersing the precursor 1 and heated to from 40 to 80° C. such that the solid matter mass of the solution 3 to the solid matter mass of the precursor 1 is from 5 to 50% by mass, and mixed together, and further aqueous ammonia or an aqueous solution of Na hydroxide is added dropwise to the resulting mixture at a solution sending rate of from 70 to 110 mL/min until the pH becomes 8 or more so as to obtain a hydroxide (precursor 2).

The process of filtering the precursor 2, dispersing the residue in deionized water, and again filtering the resulting solution is repeated 4 or 5 times, the resulting residue is then dried for a whole day and night at from 110 to 150° C. and subjected to a grinding treatment to have 100 mesh or less, and the resulting substance is then calcined for from 1 hour to 10 hours at from 650 to 850° C. in the air, whereby it is possible to obtain the ceria phase separated type CZ powder, that is, the present OSC material.

In this case, it is possible to adjust the phase separation rate of ceria by adjusting the amount of the solution 3 (ceria phase separated portion) added to the precursor 1 (the portion to be the CZ core). In addition, it is possible to adjust the phase separation rate of ceria by adjusting the content ratio (molar ratio) of cerium to zirconium, the temperature for calcination, the time for calcination, the dropping rate and the like.

(Mixing of Pyrochlore Type Ceria-Zirconia Composite Oxide)

It is preferable that the present catalyst carrier contain an OSC material containing a pyrochlore type ceria-zirconia composite oxide ($Ce_2Zr_2O_7$) in addition to the present OSC material.

It is possible to enhance the OSC not only in a low temperature region but also in a high temperature region by containing a pyrochlore type ceria-zirconia composite oxide, and thus it is possible to exert high exhaust gas purification performance in a low temperature region and a high temperature region.

The pyrochlore type ceria-zirconia composite oxide is a crystal phase which is not deposited unless the atomic arrangement of "—Ce—O—Zr—O—Ce—" is not more regular than that of the fluorite type ceria-zirconia composite oxide, and it is believed that a change in valence of Ce is more easily activated because of its high regularity, and thus it is possible to further enhance the oxygen releasing and absorbing capacity of the present catalyst carrier in a high temperature region.

In this case, with regard to the content of the pyrochlore type ceria-zirconia composite oxide, it is preferable to contain the pyrochlore type ceria-zirconia composite oxide such that the mass ratio of the phase separated fluorite type ceria-zirconia composite oxide to the pyrochlore type ceria-zirconia composite oxide is from 20:50 to 65:5 in each catalyst layer, for example, in the catalyst layer B to be described below.

It is possible to exert superior high temperature properties as an OSC material by containing the pyrochlore type ceria-zirconia composite oxide at such a proportion.

Consequently, the mass ratio of the fluorite type ceria-zirconia composite oxide to the pyrochlore type ceria-zirconia composite oxide is preferably from 20:50 to 65:5 and more preferably from 35:35 to 65:5 among them, and particularly from 35:35 to 53:17 among them from this point of view.

Meanwhile, the pyrochlore type ceria-zirconia composite oxide may have a particulate shape or another shape.

<The Present Catalyst Composition>

The catalyst composition according to an example of the present embodiment (referred to as the "present catalyst composition") contains the present catalyst carrier described above and a catalytically active component, and it is possible to contain another catalyst carrier, a binder, a stabilizing material and the like if necessary.

(Catalytically Active Component)

Examples of the catalytically active component may include palladium (Pd), platinum, rhodium, gold, silver, ruthenium, iridium, nickel, cerium, cobalt, copper, osmium, and strontium, and it is possible to use one kind of these or two or more kinds thereof in combination.

Palladium (Pd), platinum (Pt) and rhodium (Rh) are preferable among them, and it is preferable to use one kind of these or two or more kinds thereof in combination.

(Another Catalyst Carrier)

The present catalyst composition preferably contains another catalyst carrier in addition to the present catalyst carrier if necessary.

As another catalyst carrier, it is possible to contain an inorganic porous material, for example, a porous material of a compound selected from the group consisting of a silica compound, an alumina compound and a titania compound, more specifically another carrier component such as a porous material composed of a compound selected from alumina, silica, silica-alumina, an aluminosilicate, alumina-zirconia, alumina-chromia and alumina-ceria. It is possible to use one kind of these or two or more kinds thereof in combination.

(Stabilizer)

The present catalyst composition preferably contains a stabilizer if necessary.

Examples of the stabilizer may include an alkaline earth metal and an alkali metal. Among them, it possible to select one kind or two or more kinds of the metals selected from the group consisting of magnesium, barium, boron, thorium, hafnium, silicon, calcium and strontium. Among them, barium is preferable from the viewpoint that the temperature to reduce PdOx is the highest, that is, PdOx is hardly reduced.

(Binder)

The present catalyst composition preferably contains a binder if necessary.

As the binder component, it is possible to use an inorganic binder, for example, a water-soluble solution of alumina sol and the like.

The present catalyst composition may contain other components if necessary.

<The Present Catalyst>

The catalyst according to an example of the present embodiment (referred to as the "present catalyst") is formed into an appropriate shape such as a pellet shape, can be used singly as a catalyst, and can also be used in the form of being supported on a substrate made of a ceramic or a metallic material.

The present catalyst can be produced as follows. For example, the present catalyst composition, specifically, a catalytically active component, the present catalyst carrier, another catalyst carrier, a stabilizing material, a binder and water are mixed together and stirred to form a slurry, the slurry thus obtained is wash coated, for example, on a substrate such as a ceramic honeycomb body, and this is calcined so as to form a catalyst layer on the substrate surface.

(Substrate)

Examples of the material of the above substrate may include a refractory material such as ceramics and a metallic material. Examples of the material of the ceramic substrate may include a refractory ceramic material such as cordierite, cordierite-alpha alumina, silicon nitride, zircon mullite, spodumene, alumina-silica magnesia, zircon silicate, sillimanite, magnesium silicate, zircon, petalite, alpha alumina and an aluminosilicate. Examples of the material of the metal substrate may include a refractory metal such as another suitable corrosion resistant alloy having stainless steel or iron as the base.

Examples of the shape of the substrate may include a honeycomb shape, a pellet shape, and a spherical shape.

It is possible to use, for example, those made of cordierite such as ceramics as the honeycomb material. In addition, it is also possible to use a honeycomb made of a metallic material such as ferritic stainless.

It is possible to use, for example, a monolithic substrate having a large number of fine parallel gas flow paths, namely, channels inside the substrate so that a fluid flows through inside the substrate when using the substrate having the honeycomb shape. In this case, it is possible to form a catalyst layer by coating the catalyst composition on the inner wall surface of each channel of the monolithic substrate by wash coat or the (Catalyst Layer)

The catalyst layer formed using the present catalyst composition may be a single layer or a multilayer of two or more layers. In addition, it is also possible to be equipped with a catalyst layer other than the catalyst layer formed using the present catalyst composition.

The "catalyst layer" means a layer having a gas adsorption action or a gas purifying catalytic action, and the catalyst layer has the gas purifying catalytic action when containing a catalytically active component but may not necessarily contain a catalytically active component.

It is possible to layer the catalyst layer of two or more layers in the vertical direction or to form the catalyst layer by arranging two or more layers in the flow direction of the exhaust gas when forming the catalyst layer into a multilayer of two or more layers.

In these cases, a layer which is not the catalyst layer, for example, a layer composed of a porous refractory inorganic oxide powder or a layer composed of a porous refractory inorganic oxide powder and a promoter component may be present between the catalyst layers.

Preferred examples of the configuration of the present catalyst may include a configuration equipped with a catalyst layer A containing Pt or Rh or both of these and a catalyst layer B containing Pd and the present catalyst carrier.

In this case, it is possible to mention a configuration configured by providing the catalyst layer B and the catalyst layer A in this order in the flow direction of the exhaust gas or a configuration configured by providing the catalyst layer B and the catalyst layer A on the substrate in this order.

With regard to the catalyst having the configuration configured by providing the catalyst layer B and the catalyst layer A on the substrate in this order, the catalyst layer B of the lower layer exerts excellent purification performance for HC as well as is mainly responsible for the oxygen releasing and absorbing, and the catalyst layer A of the upper layer exerts excellent purification performance for CO and NOx as well as suppresses the poisoning of Pd in the catalyst layer B.

As the preferred composition of the catalyst layer A, it is possible to configure so as to contain an inorganic porous material and an OSC material and the like if necessary in addition to Pt or Rh or both of these.

As the preferred composition of the catalyst layer B, it is possible to configure so as to contain the present catalyst carrier and an inorganic porous material and the like if necessary in addition to Pd.

In this case, each of the OSC material and the inorganic porous material such as alumina is supported with Pd in the case of containing the present OSC material and an OSC material containing a pyrochlore type ceria-zirconia composite oxide in the catalyst layer B.

In the catalyst layer B, the supported amount of Pd to the ceria phase separated type $CeO_2$—$ZrO_2$-based composite oxide (100 parts by mass) is preferably 0.3 part by mass or more, particularly from 0.7 to 2.1 parts by mass, from 1.0 to 2.1 parts by mass among them, and even more preferably from 1.3 to 2.1 parts by mass particularly among them.

It is preferable to contain Pd at a proportion of 0.2 part by mass or more, from 0.2 to 1.7 parts by mass among them, from 0.2 to 1.3 parts by mass among them, and further from 0.2 to 1.0 part by mass with respect to 100 parts by mass of the pyrochlore type ceria-zirconia composite oxide in the catalyst layer B in the case of blending a pyrochlore type ceria-zirconia composite oxide in the catalyst layer B.

<Description of Phrase>

The expression "X to Y" (X and Y are an arbitrary number) in the present specification also includes the intention of "preferably more than X" or "preferably less than Y" as well as the intention of "X or more and Y or less" unless otherwise stated.

In addition, the expression "X or more" (X is an arbitrary number) or "Y or less" (Y is an arbitrary number) also includes the intention of "preferably more than X" or "preferably less than Y".

EXAMPLES

Hereinafter, the invention will be described in more detail on the basis of the following Examples and Comparative Examples.

Example 1

The supporting material composition of lower layer was prepared by mixing 69.4% by mass of a ceria phase separated type $CeO_2$—$ZrO_2$-based composite oxide, 25.0% by mass of $Al_2O_3$ as the inorganic porous material powder, and 5.6% by mass of an inorganic binder, and a Pd nitrate solution was added to the supporting material composition of lower layer in an amount corresponding to 1.2 parts by mass in terms of Pd metal with respect to 100 parts by mass of the total mass of the supporting material composition of lower layer prepared using these, thereby obtaining a Pd-containing slurry for lower layer formation.

On the other hand, the supporting material composition of upper layer was prepared by mixing 45.0% by mass of a fluorite type $CeO_2$—$ZrO_2$-based composite oxide, 45.0% by mass of $Al_2O_3$ as the inorganic porous material powder, and 7.0% by mass of an inorganic binder, a Pt nitrate solution and a Rh nitrate solution were added to the supporting material composition of upper layer in an amount corresponding to 0.3 part by mass in terms of Pt metal and 0.3 part by mass in terms of Rh metal with respect to 100 parts by mass of the total mass of the supporting material composition of upper layer prepared using these, respectively, thereby obtaining a Pt and Rh-containing slurry for upper layer formation.

Thereafter, the Pd-containing slurry for lower layer formation was coated on the φ93 mm×L 95 mm-900 cell cordierite honeycomb substrate (flow-through type carrier, 645 cc, cell density: 900 cell/inch', cell wall thickness: 2.5 mil), and the resultant was subsequently dried and then subjected to the calcination treatment for 1 hour at 500° C. so as to form a lower layer. In this case, the coated amount of Pd in the lower layer was 56.7 g/cft, and the wash coated amount was 182 g/L.

Next, the Pt and Rh-containing slurry for upper layer formation was coated on the lower layer on the cordierite honeycomb substrate having the lower layer formed by coating as described above, and the resultant was subsequently dried and then subjected to the calcination treatment for 1 hour at 500° C. so as to form an upper layer, thereby fabricating the catalyst (sample). In this case, the coated amount of Pt and the coated amount of Rh in the upper layer were 5.7 g/cft and 5.7 g/cft, respectively, and the wash coated amount was 70.4 or/L.

Meanwhile, the ceria phase separated type $CeO_2$—$ZrO_2$-based composite oxide used in the present Example was prepared as follows. In this case, the phase separation rate of ceria was adjusted by adjusting the mass ratio of the solution 3 to the precursor 1.

The phase separation rate of ceria means the peak area ratio of the diffraction peak at $2\theta=28.5°$ to the diffraction peak at $2\theta=29.5°$ determined from the X-ray diffraction pattern using a $CuK\alpha$, ray obtained by the X-ray diffraction measurement.

Aqueous ammonia or an aqueous solution of Na hydroxide was added dropwise to the solution prepared by mixing a solution (referred to as the "solution 1") obtained by dissolving Zr oxynitrate dihydrate or Zr oxychloride octahydrate in deionized water with a solution (referred to as the "solution 2") obtained by dissolving Ce nitrate hexahydrate or Ce chloride heptahydrate in deionized water at a solution sending rate of 20 mL/min until the pH became 8 or more so as to obtain a hydroxide (precursor 1: the portion to be the CZ core).

A solution (referred to as the "solution 3": ceria phase separated portion (a part thereof reacts with the previous CZ core to be a solid solution)) obtained by dissolving Ce nitrate hexahydrate or Ce chloride heptahydrate in deionized water was added to an aqueous solution which was prepared by dispersing the precursor 1 and heated to 55° C. such that the solid matter mass of the solution 3 to the solid matter mass of the precursor 1 was 5% by mass, and mixed together, and further aqueous ammonia or an aqueous solution of Na hydroxide was added dropwise to the resulting mixture at a solution sending rate of 20 mL/min until the pH became 8 or more so as to obtain a hydroxide (precursor 2).

The process of filtering the precursor 2, dispersing the residue in deionized water, and again filtering the resulting solution was repeated 4 or 5 times, the residue thus obtained was then dried for a whole day and night at 120° C. and subjected to a grinding treatment to have 100 mesh or less, and the resulting substance was then calcined for 5 hours at 800° C. in the air, thereby obtaining the ceria phase separated type CZ powder. Meanwhile, the cerium:zirconium (molar ratio) of the ceria phase separated type CZ powder thus obtained was 30:70.

Examples 2 to 8

With regard to the method of fabricating the ceria phase separated type $CeO_2$—$ZrO_2$-based composite oxide blended, the amount of the solution 3 added to the aqueous solution having the precursor 1 dispersed therein was changed. In other words, the ceria phase separated type $CeO_2$—$ZrO_2$-based composite oxide was obtained in the same manner as in Example 1 except that the solid matter mass of the solution 3 was adjusted to be 10 to 50% by mass with respect to the solid matter mass of the precursor 1 and the phase separation rate of ceria in the ceria phase separated type $CeO_2$—$ZrO_2$-based composite oxide was changed. In addition, the catalyst (sample) was fabricated in the same manner as in Example 1 except using the ceria phase separated type $CeO_2$—$ZrO_2$-based composite oxide fabricated in this manner.

Comparative Example 1

With regard to the method of fabricating the ceria phase separated type $CeO_2$—$ZrO_2$-based composite oxide blended, the amount of the solution 3 added to the aqueous solution having the precursor 1 dispersed therein was changed. In other words, the amount of solid matter mass of the solution 3 was adjusted to be 0% by mass with respect to the solid matter mass of the precursor 1 and added to the aqueous solution. In other words, the catalyst (sample) was fabricated in the same manner as in Example 1 except that the solution 3 was not added and the precursor 1 was directly subjected to the filtering process.

TABLE 1

| | | Catalyst configuration of lower layer | | | | | | | | | |
|---|---|---|---|---|---|---|---|---|---|---|---|
| | | Supporting materials of lower layer | | | | | | Pd | | | |
| | | Phase separated CZ | | | | | | Amount of Pd supported on each constituent material | | | |
| | Raw material ID | Phase separation rate of ceria X-ray diffraction peak area ratio | Added amount g/L | Py-CZ Added amount g/L | Inorganic porous $Al_2O_3$ Added amount g/L | Inorganic binder Added amount g/L | Supporting materials of lower layer g/L | Phase separated CZ g/L | Py-CZ g/L | Inorganic porous $Al_2O_3$ g/L | Total added amount of Pd g/L |
| Comparative Example 1 | A0 | 0.00 | 125.0 (69.4) | 0.0 (0.0) | 45.0 (25.0) | 10.0 (5.6) | 180.0 | 1.5 (1.2) | 0.00 (0.00) | 0.5 (1.2) | 2.0 (1.1) |
| Example 1 | A1 | 0.05 | 125.0 (69.4) | 0.0 (0.0) | 45.0 (25.0) | 10.0 (5.6) | 180.0 | 1.5 (1.2) | 0.00 (0.00) | 0.5 (1.2) | 2.0 (1.1) |
| Example 2 | A2 | 0.10 | 125.0 (69.4) | 0.0 (0.0) | 45.0 (25.0) | 10.0 (5.6) | 180.0 | 1.5 (1.2) | 0.00 (0.00) | 0.5 (1.2) | 2.0 (1.1) |
| Example 3 | A3 | 0.15 | 125.0 (69.4) | 0.0 (0.0) | 45.0 (25.0) | 10.0 (5.6) | 180.0 | 1.5 (1.2) | 0.00 (0.00) | 0.5 (1.2) | 2.0 (1.1) |
| Example 4 | A4 | 0.20 | 125.0 (69.4) | 0.0 (0.0) | 45.0 (25.0) | 10.0 (5.6) | 180.0 | 1.5 (1.2) | 0.00 (0.00) | 0.5 (1.2) | 2.0 (1.1) |
| Example 5 | A5 | 0.25 | 125.0 (69.4) | 0.0 (0.0) | 45.0 (25.0) | 10.0 (5.6) | 180.0 | 1.5 (1.2) | 0.00 (0.00) | 0.5 (1.2) | 2.0 (1.1) |
| Example 6 | A6 | 0.30 | 125.0 (69.4) | 0.0 (0.0) | 45.0 (25.0) | 10.0 (5.6) | 180.0 | 1.5 (1.2) | 0.00 (0.00) | 0.5 (1.2) | 2.0 (1.1) |
| Example 7 | A7 | 0.50 | 125.0 (69.4) | 0.0 (0.0) | 45.0 (25.0) | 10.0 (5.6) | 180.0 | 1.5 (1.2) | 0.00 (0.00) | 0.5 (1.2) | 2.0 (1.1) |
| Example 8 | A8 | 1.00 | 125.0 (69.4) | 0.0 (0.0) | 45.0 (25.0) | 10.0 (5.6) | 180.0 | 1.5 (1.2) | 0.00 (0.00) | 0.5 (1.2) | 2.0 (1.1) |

| | Catalyst configuration of upper layer | | | | | |
|---|---|---|---|---|---|---|
| | Supporting materials of upper layer | | | | | |
| | Fluorite CZ Added amount g/L | Py-CZ Added amount g/L | Inorganic porous $Al_2O_3$ Added amount g/L | Inorganic binder Added amount g/L | Supporting materials of upper layer g/L | Pt Added amount g/L | Rh Added amount g/L |
| Comparative Example 1 | 31.5 (45.0) | 0.0 (0.0) | 31.5 (45.0) | 7.0 (0.0) | 70.0 | 0.2 (0.3) | 0.2 (0.3) |

TABLE 1-continued

| | | | | | | | |
|---|---|---|---|---|---|---|---|
| Example 1 | 31.5 (45.0) | 0.0 (0.0) | 31.5 (45.0) | 7.0 (0.0) | 70.0 | 0.2 (0.3) | 0.2 (0.3) |
| Example 2 | 31.5 (45.0) | 0.0 (0.0) | 31.5 (45.0) | 7.0 (0.0) | 70.0 | 0.2 (0.3) | 0.2 (0.3) |
| Example 3 | 31.5 (45.0) | 0.0 (0.0) | 31.5 (45.0) | 7.0 (0.0) | 70.0 | 0.2 (0.3) | 0.2 (0.3) |
| Example 4 | 31.5 (45.0) | 0.0 (0.0) | 31.5 (45.0) | 7.0 (0.0) | 70.0 | 0.2 (0.3) | 0.2 (0.3) |
| Example 5 | 31.5 (45.0) | 0.0 (0.0) | 31.5 (45.0) | 7.0 (0.0) | 70.0 | 0.2 (0.3) | 0.2 (0.3) |
| Example 6 | 31.5 (45.0) | 0.0 (0.0) | 31.5 (45.0) | 7.0 (0.0) | 70.0 | 0.2 (0.3) | 0.2 (0.3) |
| Example 7 | 31.5 (45.0) | 0.0 (0.0) | 31.5 (45.0) | 7.0 (0.0) | 70.0 | 0.2 (0.3) | 0.2 (0.3) |
| Example 8 | 31.5 (45.0) | 0.0 (0.0) | 31.5 (45.0) | 7.0 (0.0) | 70.0 | 0.2 (0.3) | 0.2 (0.3) |

In Table 1, the "phase separated CZ" means a ceria phase separated type $CeO_2$—$ZrO_2$-based composite oxide, that is, a fluorite type ceria-zirconia composite oxide which contains ceria formed by phase separation, the "added amount of phase separated CZ" in the catalyst configuration of the lower layer is the content of the phase separated CZ in the supporting materials of lower layer, the "Py-CZ" means a pyrochlore type ceria-zirconia composite oxide, and the "fluorite CZ" means a fluorite type ceria-zirconia composite oxide which does not contain ceria formed by phase separation.

The "supporting materials of lower layer" means the materials except the active component (for example, Pd and the like) among the materials constituting the lower layer, and the "total mass of supporting materials of lower layer" means the total amount of those supporting materials of lower layer.

The "supporting materials of upper layer" means the materials except the active component (for example, Pt, Rh and the like) among the materials constituting the upper layer, and the "total mass of supporting materials of upper layer" means the total amount of those supporting materials of upper layer.

In addition, the amount of each material indicates the content thereof unless otherwise stated.

The numerical values in the ( ) in Tables mean the percentage by mass with respect to the total mass of supporting materials of each layer. However, the numerical values in the ( ) indicating the added amount of PdRh or Pt mean the part by mass of the supported amount of these active components with respect to 100 parts by mass of the total mass of supporting materials of each layer, and the numerical values in the ( ) indicating the supported amount of Pd of each constituent material mean the part by mass of the supported amount of Pd with respect to 100 parts by mass of each constituent material.

These are the same in Tables to be described below.

<Exhaust Gas Treating Performance Test>

The catalysts (sample) obtained in Examples and Comparative Examples were placed such that the exhaust gas flows through along the cell direction of the honeycomb substrate, the engine was driven under the following durability conditions, and the amount of the exhaust gas component after flowing through the honeycomb catalyst was measured by the following measurement method. Meanwhile, the amount of the exhaust gas component of each of Examples and Comparative Examples is presented as the relative value obtained by taking the amount of the exhaust gas component of Comparative Example 1 as 100 in Tables.

(Durability Conditions)

The following durability conditions were imposed as the deterioration treatment assuming from 50,000 to 100,000 km of driving.

Engine for durability: riding NA 2 L gasoline engine
  Used gasoline: commercially available regular gasoline
  Durability temperature and time: 1,000° C.×40 hrs+650° C.×10 hrs
  Catalyst pre-stage air fuel ratio fluctuation:
  repetition of 13.5 (10 sec)→14.6 (20 sec)→15.5 (10 sec)

(Measurement Conditions)

Vehicle for evaluation: light motor gasoline vehicle

Used gasoline: fuel for authentication test

Measuring mode: JC08Cold mode JC08Hot mode (:driving test mode that is established by the Ministry of Land, Infrastructure, Transport, and Tourism and is used when evaluating the purification capacity of vehicle exhaust gas)

Instrument for analysis of exhaust gas: MEXA7000 manufactured by HORIBA, Ltd.

Disposition of catalyst: position directly below the engine

TABLE 2

| | Relative discharged value at cold mode (%) | | |
|---|---|---|---|
| | CO | NMHC | NOx |
| Comparative Example 1 | 100 | 100 | 100 |
| Example 1 | 89 | 90 | 95 |
| Example 2 | 83 | 84 | 89 |
| Example 3 | 77 | 76 | 82 |
| Example 4 | 74 | 74 | 81 |
| Example 5 | 85 | 83 | 87 |
| Example 6 | 87 | 89 | 91 |
| Example 7 | 92 | 93 | 94 |
| Example 8 | 98 | 98 | 99 |

It has been found out that the low temperature properties as an OSC material can be enhanced and superior OSC at the time of engine start is exerted in the cases (Examples 1 to 8) of using the fluorite type ceria-zirconia composite oxide formed by the phase separation of ceria as the OSC material compared to Comparative Example 1 in which a fluorite type ceria-zirconia composite oxide is used as the OSC material.

In addition, it has been found out that the phase separation rate of ceria in the ceria phase separated type $CeO_2$—$ZrO_2$-based composite oxide (phase separated CZ) is preferably from 0.05 to 1.00, from 0.05 to 0.50 among them, and particularly 0.30 or less among them, and is even more preferably 0.10 or more or 0.25 or less among them and particularly 0.15 or more or 0.25 or less.

Examples 9 to 12

The "added amount of phase separated CZ" and the "inorganic porous $Al_2O_3$" were changed to those presented in Table 2, and the comparative investigation was performed by taking Example 4 which showed the highest evaluation result among Examples 1 to 8 above as the reference. The catalyst (sample) was fabricated in the same manner as in Example 4 except those described above.

TABLE 3

| | Catalyst configuration of lower layer | | | | | | | | | |
|---|---|---|---|---|---|---|---|---|---|---|
| | Supporting materials of lower layer | | | | | | Pd | | | |
| | Phase separated CZ | | | | | | | Amount of Pd supported on each constituent material | | |
| | Raw material ID | Phase separation rate of ceria X-ray diffraction peak area ratio | Added amount g/L | Py-CZ Added amount g/L | Inorganic porous $Al_2O_3$ Added amount g/L | Inorganic binder Added amount g/L | Supporting materials of lower layer g/L | Phase separated CZ g/L | Py-CZ g/L | Inorganic porous $Al_2O_3$ g/L | Total added amount of Pd g/L |
| Comparative Example 1 | A0 | 8.00 | 125.0 (69.4) | 0.00 (0.0) | 45.0 (25.0) | 10.0 (5.6) | 180.0 | 1.5 (1.2) | 0.0 (0.0) | 0.5 (1.2) | 2.0 (1.1) |
| Example 9 | A3 | 0.20 | 85.0 (47.2) | 0.00 (0.0) | 85.0 (47.2) | 10.0 (5.6) | 180.0 | 1.0 (1.2) | 0.0 (0.0) | 1.0 (1.2) | 2.0 (1.1) |
| Example 10 | A4 | 0.20 | 105.9 (58.3) | 0.00 (0.0) | 65.0 (36.1) | 10.0 (5.6) | 180.0 | 1.2 (1.2) | 0.0 (0.0) | 0.8 (1.2) | 2.0 (1.1) |
| Example 4 | A4 | 0.20 | 125.0 (69.4) | 0.00 (0.0) | 45.0 (25.0) | 10.0 (5.6) | 180.0 | 1.5 (1.2) | 0.0 (0.0) | 0.5 (1.2) | 2.0 (1.1) |
| Example 11 | A4 | 0.20 | 145.0 (80.0) | 0.00 (0.0) | 25.0 (13.9) | 10.0 (5.6) | 180.0 | 1.7 (1.2) | 0.0 (0.0) | 0.3 (1.2) | 2.0 (1.1) |
| Example 12 | A4 | 0.20 | 165.0 (93.7) | 0.00 (0.0) | 5.0 (2.8) | 10.0 (5.6) | 180.0 | 1.9 (1.2) | 0.0 (0.0) | 0.1 (1.2) | 2.0 (1.1) |

| | Catalyst configuration of upper layer | | | | | | |
|---|---|---|---|---|---|---|---|
| | Supporting materials of upper layer | | | | | | |
| | Fluorite CZ Added amount g/L | Py-CZ Added amount g/L | Inorganic porous $Al_2O_3$ Added amount g/L | Inorganic binder Added amount g/L | Supporting materials of upper layer g/L | Pt Added amount g/L | Rh Added amount g/L |
| Comparative Example 1 | 31.5 (45.0) | 0.0 (0.0) | 31.5 (45.0) | 2.0 (10.0) | 70.0 | 0.2 (0.3) | 0.2 (0.3) |
| Example 9 | 31.5 (45.0) | 0.0 (0.0) | 31.5 (45.0) | 7.0 (10.0) | 70.0 | 0.2 (0.3) | 0.2 (0.3) |
| Example 10 | 31.5 (45.0) | 0.0 (0.0) | 31.5 (45.0) | 7.0 (10.0) | 70.0 | 0.2 (0.3) | 0.2 (0.3) |
| Example 4 | 31.5 (45.0) | 0.0 (0.0) | 31.5 (45.0) | 7.0 (10.0) | 70.0 | 0.2 (0.3) | 0.2 (0.3) |
| Example 11 | 31.5 (45.0) | 0.0 (0.0) | 31.5 (45.0) | 7.0 (10.0) | 70.0 | 0.2 (0.3) | 0.2 (0.3) |
| Example 12 | 31.5 (45.0) | 0.0 (0.0) | 31.5 (45.0) | 7.0 (10.0) | 70.0 | 0.2 (0.3) | 0.2 (0.3) |

TABLE 4

| | Relative discharged value at cold mode (%) | | |
|---|---|---|---|
| | CO | NMHC | NOx |
| Comparative Example 1 | 100 | 100 | 100 |
| Example 9 | 138 | 82 | 105 |
| Example 10 | 98 | 85 | 93 |
| Example 4 | 74 | 74 | 81 |
| Example 11 | 84 | 92 | 91 |
| Example 12 | 91 | 107 | 95 |

As a result, it has been found out that the content of ceria phase separated type $CeO_2$—$ZrO_2$-based composite oxide (phase separated CZ) is preferably 55 to 85 parts by mass with respect to 100 parts by mass of the total mass of the supporting materials of lower layer.

Examples 13 to 16

A pyrochlore type ceria-zirconia composite oxide (Py-CZ) was blended to the sample obtained by Example 4, and the comparative investigation was performed by taking Example 4 as the reference.

The Pd-containing slurry for lower layer formation was obtained in the same manner as in Example 4 except that a pyrochlore type ceria-zirconia composite oxide (Py-CZ) was blended and also the blended amount of the ceria phase separated type $CeO_2$—$ZrO_2$-based composite oxide and pyrochlore type $CeO_2$—$ZrO_2$-based composite oxide were changed to those presented in Table 5 such that the sum of the two was 69.4% by mass when fabricating the Pd-containing slurry for lower layer formation. The catalyst (sample) was fabricated in the same manner as in Example 4 except those described above.

TABLE 5

| | | Supporting materials of lower layer | | | | | | Pd | | | |
|---|---|---|---|---|---|---|---|---|---|---|---|
| | | Phase separated CZ | | | | | | | Amount of Pd supported on each constituent material | | |
| | | | Phase separation rate of ceria | | | Inorganic porous | Inorganic | Supporting | | | | Total |
| | Raw material ID | X-ray diffraction peak area ratio | Added amount g/L | Py-CZ Added amount g/L | Al₂O₃ Added amount g/L | binder Added amount g/L | materials of lower layer g/L | Phase separated CZ g/L | Py-CZ g/L | Inorganic porous Al₂O₃ g/L | added amount of Pd g/L |
| Comparative Example 1 | A0 | 0.00 | 123.0 (69.4) | 0.0 (0.0) | 45.0 (26.0) | 10.0 (5.8) | 180.0 | 1.5 (1.2) | 0.0 (0.0) | 0.5 (3.2) | 2.0 (1.1) |
| Example 4 | A4 | 0.20 | 125.0 (69.4) | 0.0 (0.0) | 45.0 (26.0) | 10.0 (5.6) | 180.0 | 1.5 (1.2) | 0.0 (0.0) | 0.5 (3.2) | 2.0 (1.1) |
| Example 13 | A4 | 0.20 | 115.0 (63.9) | 10.0 (5.6) | 45.0 (26.0) | 10.0 (5.6) | 180.0 | 1.4 (1.2) | 0.1 (3.2) | 0.5 (3.2) | 2.0 (1.1) |
| Example 14 | A4 | 0.20 | 35.0 (52.8) | 30.0 (16.7) | 45.0 (26.0) | 10.0 (5.6) | 180.0 | 1.1 (1.2) | 0.4 (1.2) | 0.5 (3.2) | 2.0 (1.1) |
| Example 15 | A4 | 0.20 | 65.0 (36.1) | 60.0 (33.3) | 45.0 (26.0) | 10.0 (5.6) | 180.0 | 0.8 (1.2) | 0.7 (1.2) | 0.5 (3.2) | 2.0 (1.1) |
| Example 16 | A4 | 0.20 | 35.0 (10.4) | 60.0 (50.0) | 45.0 (26.0) | 10.0 (5.6) | 180.0 | 0.4 (1.2) | 1.1 (1.2) | 0.5 (3.2) | 2.0 (1.1) |

| | Supporting materials of upper layer | | | | | | |
|---|---|---|---|---|---|---|---|
| | Fluorite CZ Added amount g/L | Py-CZ Added amount g/L | Inorganic porous Al₂O₃ Added amount g/L | Inorganic binder Added amount g/L | Supporting materials of upper layer g/L | Pt Added amount g/L | Rh Added amount g/L |
| Comparative Example 1 | 31.5 (45.0) | 0.0 (0.0) | 31.5 (45.0) | 7.0 (10.0) | 70.0 | 0.2 (0.3) | 0.2 (0.3) |
| Example 4 | 31.5 (45.0) | 0.0 (0.0) | 31.5 (45.0) | 7.0 (10.0) | 70.0 | 0.2 (0.3) | 0.2 (0.3) |
| Example 13 | 31.5 (45.0) | 0.0 (0.0) | 31.5 (45.0) | 7.0 (10.0) | 70.0 | 0.2 (0.3) | 0.2 (0.3) |
| Example 14 | 31.5 (45.0) | 0.0 (0.0) | 31.5 (45.0) | 7.0 (10.0) | 70.0 | 0.2 (0.3) | 0.2 (0.3) |
| Example 15 | 31.5 (45.0) | 0.0 (0.0) | 31.5 (45.0) | 7.0 (10.0) | 70.0 | 0.2 (0.3) | 0.2 (0.3) |
| Example 16 | 31.5 (45.0) | 0.0 (0.0) | 31.5 (45.0) | 7.0 (10.0) | 70.0 | 0.2 (0.3) | 0.2 (0.3) |

TABLE 6

| | Relative discharged value at cold mode (%) | | | Relative discharged value at hot mode (%) | | |
|---|---|---|---|---|---|---|
| | CO | NMHC | NOx | CO | NMHC | NOx |
| Comparative Example 1 | 100 | 100 | 100 | 100 | 100 | 100 |
| Example 4 | 74 | 74 | 81 | 97 | 106 | 88 |
| Example 13 | 73 | 72 | 77 | 80 | 90 | 70 |
| Example 14 | 71 | 71 | 72 | 53 | 68 | 45 |
| Example 15 | 76 | 71 | 79 | 63 | 84 | 52 |
| Example 16 | 82 | 78 | 92 | 71 | 89 | 66 |

As a result, it has been found out that it is possible to enhance not only the low temperature properties as an OSC material but also the high temperature properties as an OSC material by adding a pyrochlore type $CeO_2$—$ZrO_2$-based composite oxide to the ceria phase separated type $CeO_2$—$ZrO_2$-based composite oxide.

In this case, with regard to the content of the pyrochlore type $CeO_2$—$ZrO_2$-based composite oxide, it has been found out that it is preferable to contain the pyrochlore type $CeO_2$—$ZrO_2$-based composite oxide such that the mass ratio of the ceria phase separated type $CeO_2$—$ZrO_2$-based composite oxide ("phase separated CZ" in Table) to the pyrochlore type $CeO_2$—$ZrO_2$-based composite oxide ("Py-CZ" in Table) is from 20:50 to 65:5, from 35:35 to 65:5 among them, and particularly from 35:35 to 53:17 among them in the lower layer.

Example 17

The catalyst was fabricated in the same manner as in Example 14 except that a pyrochlore type ceria-zirconia composite oxide (Py-CZ) was blended in the upper layer as well.

TABLE 7

Catalyst configuration of lower layer

Supporting materials of lower layer

| | Phase separated CZ | | | | | | | Pd | | | |
|---|---|---|---|---|---|---|---|---|---|---|---|
| | | Phase separation rate of ceria | | | | | | Amount of Pd supported on each constituent material | | | |
| | Raw material ID | X-ray diffraction peak area ratio | Added amount g/L | Py-CZ Added amount g/L | Al₂O₃ Added amount g/L | Inorganic binder Added amount g/L | Supporting materials of lower layer g/L | Phase separated CZ g/L | Py-CZ g/L | Inorganic porous Al₂O₃ g/L | Total added amount of Pd g/L |
| Comparative Example 1 | A0 | 0.20 | 125.0 (69.4) | 0.0 (0.0) | 45.0 (28.0) | 10.0 (6.8) | 180.0 | 1.5 (1.2) | 0.0 (0.0) | 0.5 (1.2) | 2.0 (1.1) |
| Example 4 | A4 | 0.20 | 135.0 (68.4) | 0.0 (0.0) | 45.0 (25.0) | 10.0 (6.8) | 180.0 | 1.5 (1.2) | 0.0 (0.0) | 0.5 (1.2) | 2.0 (1.1) |
| Example 13 | A4 | 0.20 | 85.0 (52.8) | 30.0 (16.7) | 45.0 (25.0) | 10.0 (6.8) | 180.0 | 1.1 (1.2) | 0.4 (1.2) | 0.5 (1.2) | 2.0 (1.1) |
| Example 14 | A4 | 0.20 | 85.0 (36.3) | 60.0 (33.3) | 45.0 (25.0) | 10.0 (6.8) | 180.0 | 0.8 (1.2) | 0.7 (1.2) | 0.5 (1.2) | 2.0 (1.1) |
| Example 17 | A4 | 0.20 | 85.0 (53.8) | 30.3 (16.7) | 45.0 (25.0) | 10.0 (6.8) | 180.0 | 1.1 (3.2) | 0.4 (1.2) | 0.5 (1.2) | 2.0 (1.1) |

Catalyst configuration of upper layer

Supporting materials of upper layer

| | Fluorite CZ Added amount g/L | Py-CZ Added amount g/L | Inorganic porous Al₂O₃ Added amount g/L | Inorganic binder Added amount g/L | Supporting materials of upper layer g/L | Pt Added amount g/L | Rh Added amount g/L |
|---|---|---|---|---|---|---|---|
| Comparative Example 1 | 31.5 (45.0) | 0.0 (0.0) | 31.5 (45.0) | 7.0 (0.0) | 70.0 | 0.2 (0.3) | 0.2 (0.3) |
| Example 4 | 31.5 (45.0) | 0.0 (0.0) | 31.5 (45.0) | 7.0 (0.0) | 70.0 | 0.2 (0.3) | 0.2 (0.3) |
| Example 13 | 31.5 (45.0) | 0.0 (0.0) | 31.5 (45.0) | 7.0 (0.0) | 70.0 | 0.2 (0.3) | 0.2 (0.3) |
| Example 14 | 31.5 (45.0) | 0.0 (0.0) | 31.5 (45.0) | 7.0 (0.0) | 70.0 | 0.2 (0.3) | 0.2 (0.3) |
| Example 17 | 0.0 (0.0) | 31.5 (45.0) | 31.5 (45.0) | 7.0 (0.0) | 70.0 | 0.2 (0.3) | 0.2 (0.3) |

TABLE 8

| | Relative discharged value at cold mode (%) | | | Relative discharged value at hot mode (%) | | |
|---|---|---|---|---|---|---|
| | CO | NMHC | NOx | CO | NMHC | NOx |
| Comparative Example 1 | 100 | 100 | 100 | 100 | 100 | 100 |
| Example 4 | 74 | 74 | 81 | 97 | 106 | 88 |
| Example 13 | 71 | 71 | 72 | 53 | 68 | 45 |
| Example 14 | 76 | 71 | 79 | 63 | 84 | 52 |
| Example 17 | 70 | 74 | 74 | 55 | 82 | 56 |

It has been found out that the pyrochlore type ceria-zirconia composite oxide (Py-CZ) may be blended or may not be blended in the upper layer since the influence as an OSC material is little on the effect even when the pyrochlore type ceria-zirconia composite oxide (Py-CZ) is blended in the upper layer.

Examples 18 to 20

The catalyst (sample) was fabricated in the same manner as in Example 13 except that the total mass of the supporting materials of lower layer was changed to those presented in Table 9 in Example 13 above.

TABLE 9

Catalyst configuration of lower layer

Supporting materials of lower layer

| | Phase separated CZ | | | | | | | Pd | | | |
|---|---|---|---|---|---|---|---|---|---|---|---|
| | | Phase separation rate of ceria | | | | | | Amount of Pd supported on each constituent material | | | |
| | Raw material ID | X-ray diffraction peak area ratio | Added amount g/L | Py-CZ Added amount g/L | Al₂O₃ Added amount g/L | Inorganic binder Added amount g/L | Supporting materials of lower layer g/L | Phase separated CZ g/L | Py-CZ g/L | Inorganic porous Al₂O₃ g/L | Total added amount of Pd g/L |
| Comparative Example 1 | A0 | 0.00 | 125.0 (69.4) | 0.0 (0.0) | 45.0 (25.0) | 10.0 (5.6) | 180.0 | 1.5 (1.2) | 0.0 (0.0) | 0.5 (1.2) | 2.0 (1.1) |

TABLE 9-continued

| | | | | | | | | | | | |
|---|---|---|---|---|---|---|---|---|---|---|---|
| Example 4 | A4 | 0.20 | 125.0 (69.4) | 0.0 (0.0) | 45.0 (25.0) | 10.0 (5.6) | 320.2 | 1.5 (1.2) | 0.0 (0.0) | 0.5 (3.2) | 2.0 (1.3) |
| Example 18 | A4 | 0.20 | 116.1 (52.8) | 36.7 (16.7) | 45.0 (25.0) | 10.0 (5.6) | 180.0 | 1.1 (1.0) | 0.4 (1.0) | 0.5 (1.0) | 2.0 (0.9) |
| Example 13 | A4 | 0.20 | 95.0 (52.8) | 30.0 (16.7) | 45.0 (25.0) | 10.0 (5.6) | 140.0 | 1.1 (1.2) | 0.4 (1.3) | 0.5 (3.2) | 2.0 (1.3) |
| Example 19 | A4 | 0.20 | 73.2 (52.8) | 23.2 (16.7) | 45.0 (25.0) | 10.0 (5.6) | 140.0 | 1.1 (1.8) | 0.4 (1.5) | 0.5 (1.5) | 2.0 (3.4) |
| Example 20 | A4 | 0.20 | 58.3 (52.8) | 18.3 (16.7) | 45.0 (25.0) | 10.0 (5.6) | 110.0 | 1.1 (1.9) | 0.4 (1.9) | 0.5 (1.9) | 2.0 (1.8) |

| | Catalyst configuration of upper layer | | | | | | |
|---|---|---|---|---|---|---|---|
| | Supporting materials of upper layer | | | | | | |
| | Fluorite CZ Added amount g/L | Py-CZ Added amount g/L | Inorganic porous $Al_2O_3$ Added amount g/L | Inorganic binder Added amount g/L | Supporting materials of upper layer g/L | Pt Added amount g/L | Rh Added amount g/L |
| Comparative Example 1 | 31.5 (45.0) | 0.0 (0.0) | 31.5 (45.0) | 7.0 (10.0) | 70.0 | 0.2 (0.3) | 0.2 (0.3) |
| Example 4 | 31.5 (45.0) | 0.0 (0.0) | 31.5 (45.0) | 7.0 (10.0) | 70.0 | 0.2 (0.3) | 0.2 (0.3) |
| Example 18 | 31.5 (45.0) | 0.0 (0.0) | 31.5 (45.0) | 7.0 (10.0) | 70.0 | 0.2 (0.3) | 0.2 (0.3) |
| Example 13 | 31.5 (45.0) | 0.0 (0.0) | 31.5 (45.0) | 7.0 (10.0) | 70.0 | 0.2 (0.3) | 0.2 (0.3) |
| Example 19 | 31.5 (45.0) | 0.0 (0.0) | 31.5 (45.0) | 7.0 (10.0) | 70.0 | 0.2 (0.3) | 0.2 (0.3) |
| Example 20 | | | | | | | |

TABLE 10

| | Relative discharged value at cold mode (%) | | | Relative discharged value at hot mode (%) | | |
|---|---|---|---|---|---|---|
| | CO | NMHC | NOx | CO | NMHC | NOx |
| Comparative Example 1 | 100 | 100 | 100 | 100 | 100 | 100 |
| Example 4 | 74 | 74 | 81 | 97 | 106 | 88 |
| Example 18 | 83 | 87 | 91 | 50 | 65 | 43 |
| Example 13 | 71 | 71 | 72 | 53 | 68 | 45 |
| Example 19 | 63 | 68 | 70 | 72 | 82 | 52 |
| Example 20 | 60 | 67 | 68 | 80 | 119 | 69 |

As a result, it has been found out that the total mass of the supporting materials of lower layer is preferably from 110 to 220 g/L and even more preferably 140 g/L or more or 180 g/L or more among them.

Example 21

To a Pd nitrate solution corresponding to 2.1 parts by mass in terms of Pd metal, 100 parts by mass of ceria phase separated type $CeO_2$—$ZrO_2$-based composite oxide was added, and the ceria phase separated type $CeO_2$—$ZrO_2$-based composite oxide was supported with Pd so as to obtain a phase separated CZ and Pd-containing slurry.

To a Pd nitrate solution corresponding to 0.2 part by mass in terms of Pd metal, 100 parts by mass of pyrochlore type $CeO_2$—$ZrO_2$-based composite oxide was added, and the pyrochlore type $CeO_2$—$ZrO_2$-based composite oxide was supported with Pd so as to obtain a Py-CZ and Pd-containing slurry.

In addition, 100 parts by mass of inorganic porous $Al_2O_3$ as an inorganic porous material powder was added to a Pd nitrate solution corresponding to 1.2 parts by mass in terms of Pd metal, and the inorganic porous $Al_2O_3$ was supported with Pd so as to obtain an $Al_2O_3$ and Pd-containing slurry.

Thereafter, the phase separated CZ and Pd-containing slurry, the Py-CZ and Pd-containing slurry and the inorganic porous $Al_2O_3$ and Pd-containing slurry were mixed together at a mass proportion of 65/180, 60/180, and 45/180 with respect to the total mass of the supporting materials of lower layer (180 g/L) as the solid matter mass, respectively. Furthermore, an inorganic binder was added at a mass proportion of 10/180 with respect to this mixed slurry so as to obtain a Pd-containing slurry for lower layer formation. The catalyst (sample) was fabricated in the same manner as in Example 4 except those described above.

Examples 22 to 25

The catalyst (sample) was fabricated in the same manner as in Example 21 except that the supported amount of Pd with respect to the ceria phase separated type $CeO_2$—$ZrO_2$-based composite oxide and the supported amount of Pd with respect to the pyrochlore type $CeO_2$—$ZrO_2$-based composite oxide were changed to those presented in Table 11.

TABLE 11

| | Catalyst configuration of lower layer | | | | | | | | | | |
|---|---|---|---|---|---|---|---|---|---|---|---|
| | Supporting materials of lower layer | | | | | | | | | | |
| | Phase separated CZ | | | | | | | Pd | | | |
| | | Phase separation rate of ceria | | | Inorganic porous | Inorganic | | Amount of Pd supported on each constituent material | | | |
| | Raw material ID | X-ray diffraction peak area ratio | Added amount g/L | Py-CZ Added amount g/L | $Al_2O_3$ Added amount g/L | binder Added amount g/L | Supporting materials of lower layer g/L | Phase separated CZ g/L | Py-CZ g/L | Inorganic porous $Al_2O_3$ g/L | Total added amount of Pd g/L |
| Comparative Example 1 | A0 | 0.10 | 125.0 (69.4) | 0.0 (0.0) | 45.0 (25.0) | 10.0 (5.6) | 180.0 | 1.5 (1.2) | 0.0 (0.0) | 0.5 (1.2) | 2.0 (1.1) |

TABLE 11-continued

| | | | | | | | | | | | |
|---|---|---|---|---|---|---|---|---|---|---|---|
| Example 4 | A4 | 0.20 | 125.0 (69.4) | 0.0 (0.0) | 45.0 (25.0) | 10.0 (5.6) | 180.0 | 1.5 (1.2) | 0.1 (0.2) | 0.5 (1.2) | 2.0 (1.1) |
| Example 21 | A4 | 0.20 | 65.0 (36.1) | 80.0 (33.3) | 45.0 (25.0) | 10.0 (5.6) | 180.0 | 1.5 (1.2) | 0.3 (6.5) | 0.5 (1.2) | 2.0 (1.1) |
| Example 22 | A4 | 0.20 | 66.0 (36.1) | 80.0 (33.3) | 45.0 (25.0) | 10.0 (5.6) | 180.0 | 1.5 (1.2) | 0.5 (1.0) | 0.5 (1.2) | 2.0 (1.1) |
| Example 23 | A4 | 0.20 | 65.0 (36.1) | 80.0 (33.3) | 45.0 (25.0) | 10.0 (5.6) | 180.0 | 1.5 (1.2) | 0.8 (1.3) | 0.5 (1.2) | 2.0 (1.1) |
| Example 24 | A4 | 0.20 | 66.0 (36.1) | 80.0 (33.3) | 45.0 (25.0) | 10.0 (5.6) | 180.0 | 1.5 (1.2) | 1.0 (1.7) | 0.8 (1.2) | 2.0 (1.1) |
| Example 25 | A4 | 0.20 | 85.0 (36.1) | 80.0 (33.3) | 45.0 (25.0) | 10.0 (5.6) | 180.0 | 1.5 (1.2) | | | |

| | Catalyst configuration of upper layer | | | | | | |
|---|---|---|---|---|---|---|---|
| | Supporting materials of upper layer | | | | | | |
| | Fluorite CZ Added amount g/L | Py-CZ Added amount g/L | Inorganic porous Al$_2$O$_3$ Added amount g/L | Inorganic binder Added amount g/L | Supporting materials of upper layer g/L | Pt Added amount g/L | Rh Added amount g/L |
| Comparative Example 1 | 31.5 (45.0) | 0.0 (0.0) | 31.5 (45.0) | 7.0 (10.0) | 70.0 | 0.2 (0.3) | 0.2 (0.3) |
| Example 4 | 31.5 (45.0) | 0.0 (0.0) | 31.5 (45.0) | 7.0 (10.0) | 70.0 | 0.2 (0.3) | 0.2 (0.3) |
| Example 21 | 31.5 (45.0) | 0.0 (0.0) | 31.5 (45.0) | 7.0 (10.0) | 70.0 | 0.2 (0.3) | 0.2 (0.3) |
| Example 22 | 31.5 (45.0) | 0.0 (0.0) | 31.5 (45.0) | 7.0 (10.0) | 70.0 | 0.2 (0.3) | 0.2 (0.3) |
| Example 23 | 31.5 (45.0) | 0.0 (0.0) | 31.5 (45.0) | 7.0 (10.0) | 70.0 | 0.2 (0.3) | 0.2 (0.3) |
| Example 24 | 31.5 (45.0) | 0.0 (0.0) | 31.5 (45.0) | 7.0 (10.0) | 70.0 | 0.2 (0.3) | 0.2 (0.3) |
| Example 25 | 31.5 (45.0) | 0.0 (0.0) | 31.5 (45.0) | 7.0 (10.0) | 70.0 | 0.2 (0.3) | 0.2 (0.3) |

TABLE 12

| | Relative discharged value at cold mode (%) | | | Relative discharged value at hot mode (%) | | |
|---|---|---|---|---|---|---|
| | CO | NMHC | NOx | CO | NMHC | NOx |
| Comparative Example 1 | 100 | 100 | 100 | 100 | 100 | 100 |
| Example 4 | 74 | 74 | 81 | 97 | 106 | 88 |
| Example 21 | 71 | 71 | 76 | 94 | 91 | 84 |
| Example 22 | 61 | 62 | 65 | 74 | 54 | 60 |
| Example 23 | 64 | 64 | 69 | 80 | 72 | 64 |
| Example 24 | 76 | 74 | 76 | 90 | 81 | 85 |
| Example 25 | 77 | 79 | 78 | 98 | 105 | 87 |

As a result, it has been found out that the supported amount of Pd with respect to the ceria phase separated type CeO$_2$—ZrO$_2$-based composite oxide (100 parts by mass) is preferably 0.3 part by mass or more, particularly from 0.7 to 2.1 parts by mass, and from 1.0 to 2.1 parts by mass among them, and particularly, even more preferably from 1.3 to 2.1 parts by mass among them.

In addition, the supported amount of Pd with respect to the pyrochlore type CeO$_2$—ZrO$_2$-based composite oxide (100 parts by mass) is preferably 0.2 part by mass or more, from 0.2 to 1.7 parts by mass among them, from 0.2 to 1.3 parts by mass among them, and further from 0.2 to 1.0 part by mass.

The invention claimed is:

1. A catalyst carrier for exhaust gas comprising:
    a fluorite type ceria-zirconia composite oxide; and
    ceria formed from the fluorite type ceria-zirconia composite oxide by phase separation,
    wherein a peak area ratio of a diffraction peak at 2θ=28.5° to a diffraction peak between 2θ=29.0 to 30.0° determined from an X-ray diffraction pattern using a CuKα ray obtained by an X-ray diffraction measurement is from 0.05 to 1.00.

2. A catalyst carrier for exhaust gas comprising:
    the catalyst carrier for exhaust gas according to claim 1 and a catalyst carrier for exhaust gas containing a pyrochlore type ceria-zirconia composite oxide.

3. The catalyst carrier for exhaust gas according to claim 2, wherein a mass ratio of a fluorite type ceria-zirconia composite oxide to a pyrochlore type ceria-zirconia composite oxide is from 20:50 to 65:5.

4. A catalyst composition comprising:
    Pd; and
    the catalyst carrier for exhaust gas according to claim 1.

5. An exhaust gas purifying catalyst comprising:
    a catalyst layer A containing Pt, Rh, or combination thereof; and
    a catalyst layer B containing Pd, wherein
    at least the catalyst layer B contains the catalyst carrier for exhaust gas according to claim 1.

6. The exhaust gas purifying catalyst according to claim 5, wherein Pd is contained at from 0.3 to 8.0% by mass with respect to a total amount of a fluorite type ceria-zirconia composite oxide and ceria formed by phase separation.

* * * * *